May 18, 1965 W. D. RIGGS 3,184,671
MOTOR SPEED GOVERNOR CIRCUIT
Filed Aug. 18, 1958
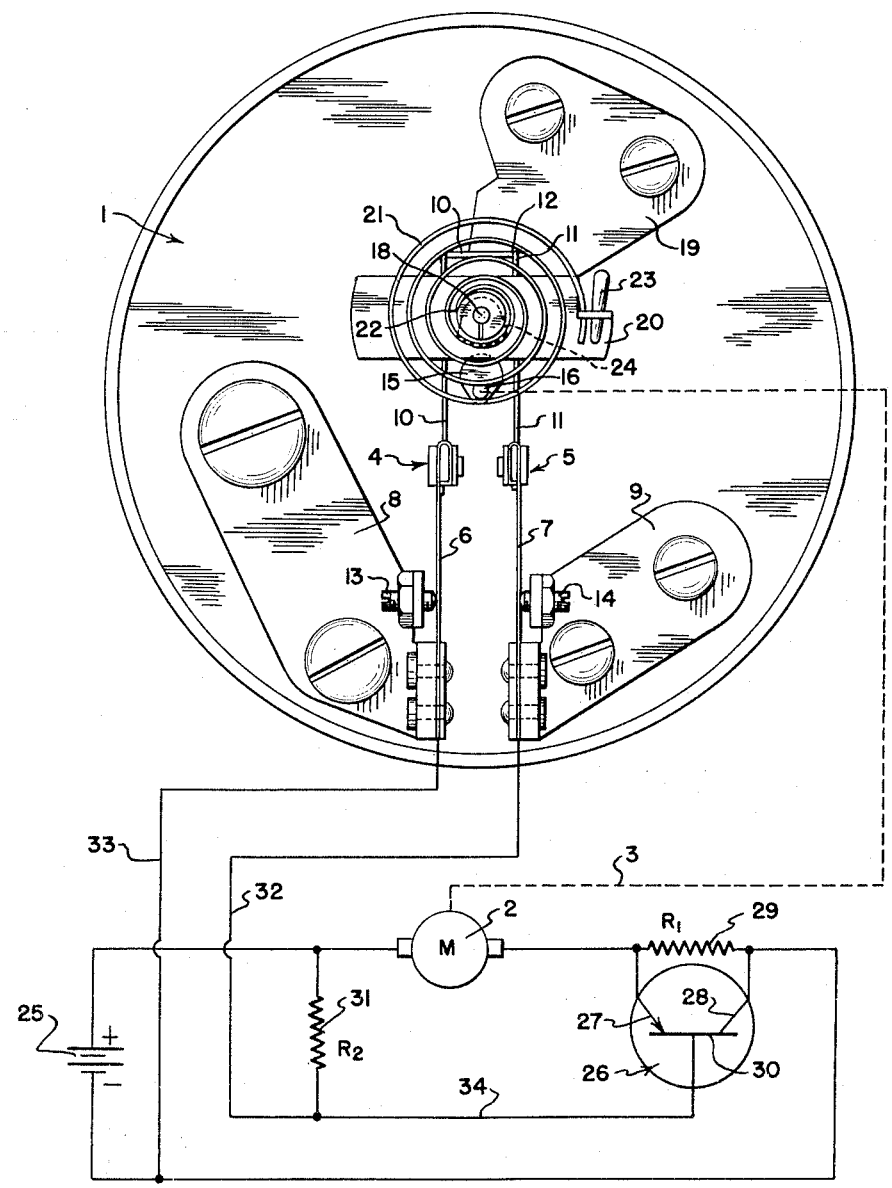
INVENTOR.
BY William D. Riggs
ATTORNEYS United States Patent Office 3,184,671
Patented May 18, 1965

3,184,671
MOTOR SPEED GOVERNOR CIRCUIT
William D. Riggs, Woodbury, Conn., assignor to Consolidated Electronics Industries Corp., Waterbury, Conn., a corporation of Delaware
Filed Aug. 18, 1958, Ser. No. 755,709
1 Claim. (Cl. 318—325)

This invention relates to the regulation of the speed of electric motors, and more particularly to an improved electrical circuit and apparatus for governing the speed of an electric motor.

In the co-pending application for United States patent of Loisius J. A. Van Lieshout, Serial No. 662,592, filed November 16, 1956, for Motor Speed Governor Circuit, it is pointed out that the current industrial demand for miniaturized electrical apparatus having the ruggedness and life expectancy of much larger apparatus has created particularly difficult problems where electrical make-and-break contacts are interposed between a load and the power source. Limitations on the size of the whole apparatus often dictate the use of contact points which were designed for maximum currents that barely equal or exceed the average current the contacts are expected to carry and that are substantially less than the peak or surge currents to be carried.

Miniaturization of apparatus which includes make-and-break contacts raises corresponding mechanical problems, in that is is extremely difficult for relatively tiny components to maintain sufficiently high contact pressure for the currents to be carried.

These problems have been found through experience to be especially difficult to overcome in miniaturized embodiments of the governor disclosed in the United States patent to A. W. Haydon, No. 2,740,080, even though the governor is entirely satisfactory in all other respects. The Haydon patent describes an electric motor in circuit with a power source which is intentionally sufficient to overspeed the motor. A pair of make-and-break electrical contacts driven by the mechanical governor is utilized to open the power circuit for the motor at variable intervals related to the speed of the motor so that the average speed is maintained very nearly constant. The make-and-break repetition rate required by this arrangement is very high. Miniaturized versions of the Haydon governor experience current surges which cause considerable overheating and erosion of the contacts. In many applications this is not a serious matter, for the intended operational life of the apparatus is not very long. However, it has been known for some time that there would be many other applications of the Haydon governor if the life of the governor driven contacts could be reliably extended without resorting to conventional techniques such as increasing the contact areas, providing heavier springs and other structural members to increase contact pressures.

The Van Lieshout application referred to above discloses one quite satisfactory solution of the problem of reducing contact wear in conventional applications of the Haydon governor. Basically, the invention disclosed and claimed in that application is the provision of a semiconductor device, commonly known as a transistor, connected in the motor power supply circuit of the Haydon governor in such a way that the relatively high motor current passes only through the transistor. Then the governor contacts are utilized to make-and-break a circuit which carries only the relatively small current required to control the conductivity of the transistor and, hence, of the power circuit.

In the Van Lieshout circuit, separate batteries or other potential sources are utilized to power the motor and to provide a control potential for the transistor. As stated, this arrangement is satisfactory for general application, but it has been found that its usefulness is limited in specialized applications, particularly where the ambient temperature varies from well below freezing to upwards of 85° C. In particular, it has been found that this circuit is unstable at higher temperatures due to temperature-variable characteristics of transistors for which the circuit is not inherently capable of compensating.

I have invented an improvement of the Van Lieshout motor governor circuit which automatically compensates for the temperature-variable characteristics of transistors over a wide range of temperatures. Moreover, I have succeeded in eliminating the need for the separate battery or other source to provide the potential for controlling the conductivity of the transistor. The result is that all the substantial benefits of the Van Lieshout circuit for miniaturized governor apparatus have been retained and at the same time I have eliminated one of the relatively large and more expensive components, namely, the bias battery. My new circuit will remain stable and operate reliably over a very wide range of operating conditions.

According to my invention a variable speed motor is energized by a circuit comprising a motor power supply, a pair of governor driven electrical contact members and a semi-conductor device having collector, emitter and base electrodes. The power supply, the armature of the motor and the emitter and collector electrodes of the semi-conductor or transistor are connected in a first series circuit. Additionally, I provide a second series circuit comprising the motor power source, a resistive element and the governor contacts. A base electrode of the transistor of the electrode is connected to a point on the resistive element in the second series circuit.

Stated more broadly the invention comprises a power source and a load which is to be selectively energized at different potentials. The load and source are connected in series. A semi-conductor device having emitter, collector and base electrodes is connected into the circuit so that the emitter and collector electrodes are energized at different potentials. Means are provided for energizing said base electrode with a potential which is higher than the potentials applied to either of the other electrodes. Finally, means are provided for selectively connecting the base electrode and another of said electrodes to a point in said circuit which is at substantially the same potential.

One feature of my circuit is that suitable forward and reverse bias potentials for the transistor are developed within the circuit itself, thus eliminating the need for a separate source of bias potential such as a battery. An additional feature of this circuit is that, with reasonably careful selection of component characteristics, namely, of a transistor having a low ratio of collector to base current at normal temperatures, the transistor will maintain close and positive control over the motor power supply circuit even at high temperatures.

A preferred embodiment of my invention is fully described in the following specification in which reference is made to the accompanying drawing. In the drawing there is shown a motor speed governor, such as that described in the Haydon Patent No. 2,740,080, in combination with my new motor power supply circuit. Only so much of the governor apparatus as is necessary to a complete understanding of this invention will be described here. For a complete description of the governor the reader is directed to the Haydon patent.

As shown in FIG. 1 a base plate 1 has assembled thereon a governor mechanism. This plate is usually mounted directly on the end of the housing of a motor, the speed of which is to be governed. So that this invention may be fully understood, the motor is shown symbolically at 2 and its driving connection to the governor mechanism is indicated by the broken line 3. As actually constructed, however, the motor and the governor mechanism are preferably contained within the same housing.

The governor mechanism includes a pair of spring contact elements 4 and 5 which comprise, respectively, leaf spring members 6 and 7 which are separately mounted on and electrically insulated from each other by means of the mounting brackets 8 and 9. These mounting brackets are fixed to the plate 1 by screws.

A substantially rigid, L-shaped contact member 10 is fixed to the free end of spring member 6 of spring contact element 4, and a substantially rigid and straight contact member 11 is fixed to the free end of spring member 7 of spring contact element 5. The spring contact elements 4 and 5 are so positioned that extension members 10 and 11 are normally urged into contact with each other at their free ends. This contact between the members occurs at 12. Adjusting screws 13 and 14 are threaded into the brackets 8 and 9, respectively, and bear on the springs 6 and 7. These screws permit adjustment of the contact pressure between the members 10 and 11.

A cam 15 is mounted on a shaft 16 which is rotatably driven by the motor 2, either directly from the shaft 16 of the motor or through a suitable train of gears. The cam 15 is positioned between the spaced, parallel portions of the contact members 10 and 11 of spring contact elements 4 and 5.

As the cam 15 is rotated by the motor shaft 16, the lobe of the cam alternately engages the contact member 10 and then the contact member 11; however, the maximum displacement of the cam lobe is such that the displacement which it imposes on either of the contact members 10 or 11 is not sufficient by itself to cause a separation or break at the contact point 12.

A constant speed device, or, more precisely, a constant frequency device drives a cam which cooperates with the rotating cam 15 to actuate the contact members 10 and 11. This device comprises a supporting post 18 fixed at its lower end to the bracket 19 which is bolted onto the plate 1. The supporting post extends out of the plane of the drawing and is so positioned that it is between the contact members 10 and 11. An inertial member which may be a clock-work-type balance wheel or an elongated rectangular bar 20 which is satisfactory for this purpose is rotatably journaled at its center on the post adjacent the upper end thereof. A helical hairspring 21 is mounted on the upper end of the post (as seen in FIG. 1), the inner end of the spring being fixed to the post itself, as at 22, and the outer end of the spring being fixed to the bar 20 radially outward from its center by means of a wedge 23 which frictionally secures the spring in a slot in the bar. The combination of the rotatably mounted bar and the spring forms an oscillating system having a constant frequency.

A cam 24 is fixed to the inertial bar 20 to oscillate therewith. This cam is arranged to engage alternately the contact members 10 and 11 in the same manner as cam 15. It is noted that the centers of rotation of both cams 15 and 24 lie on a line normally midway between the spring contact elements 10 and 11. As explained in greater detail in the Haydon patent referred to above, the maximum throw of the motor driven cam 15 should be slightly greater than the maximum throw of the cam 24 so that when either of the contact elements is displaced to the maximum extent by the motor driven cam 15, the cam 24 may pass freely to and through its position of maximum displacement. This condition obtains when the cams are in phase and, as explained above, the contact members 10 and 11 will not break at 12. On the other hand, when the cams are out of phase so that one cam engages the contact member 10 while the other cam engages the member 11, the contact members are momentarily held apart at 12.

The frequency of oscillation of the inertial bar 20 and cam 24 is made such that, in cooperation with the period of rotation of the cam 15, the contact members 10 and 11 are open at 12 whenever the rotational speed of the cam 15 and hence the rotational speed of the motor exceeds some predetermined speed.

As previously explained the motor driving the cam 15 through the mechanical connection 3 is symbolically indicated at 2. Power for the motor is provided by the battery 25 or any other suitable source. The source voltage must be generally sufficient to cause the motor to run at some speed greater than the predetermined desired speed if the motor were not otherwise controlled.

According to my invention, the energizing current for the motor 2 is supplied through a series circuit which comprises the battery 25, the armature of the motor, the emitter electrode 27 and the collector electrode 28 of the transistor 26. In this circuit the negative terminal of the battery is connected to the collector electrode of the transistor 26. A resistor 29 is connected in shunt to the emitter and collector electrodes of the transistor.

A resistor 31 is connected from the junction between the positive terminal of the battery 25 and the motor armature 2 to the base electrode 30 of the transistor. The governor contacts are connected by leads 32 and 33 between the base electrode and the negative terminal of the battery.

The motor and resistor 29 connected in series with the battery constitute a voltage divider from which the collector electrode 28 and the emitter electrode 27 are energized through connections to successively higher points of potential on the voltage divider. The ultimate result of this arrangement is that the circuit operates as though resistor 29 and the transistor 26 were respectively a high resistance and a low resistance in shunt and there were means provided for switching the low resistance, to which the transistor corresponds, into and out of the circuit. The switching effect is derived from the different bias potentials which are developed across the resistor 31 as the governor contacts open and close.

As an illustration, assume that the terminal voltage of the battery 25 is 30 volts. Then, when the governor contacts are open the equivalent low shunt resistance of the transistor is out of the circuit and the voltage drop across the motor is 4 volts and the voltage drop between the emitter and collector electrodes is 26 volts. On the other hand, when the governor contacts are closed the control potential developed across the resistance 31 is effectively the same as the terminal voltage of the battery 25. Also note that the base and collector electrodes are effectively connected to points having substantially the same potential, that is, the negative terminal of the battery. Then, the voltage drop across the motor raises substantially while the voltage drop across the emitter and collector electrodes is reduced. Thus, when the contacts are closed the motor tends to overspeed because of the higher voltage applied. The governor then operates as described above to open the contacts. The voltage applied to the motor is then decreased and the motor slows down, whereupon the contacts are again closed.

It should be noted that this circuit develops, independently of any separate bias batteries, all of the necessary bias voltages required to operate the transistor. The voltage drop across the motor when the contacts are closed is of a polarity which reverse biases the emitter-base junction of the transistor. Accordingly, the motor voltage drop less the voltage drop across resistor 31 due to the collector-base current of the transistor is the total cutoff bias available.

For optimum stability over wide variations of temperature the value of the resistor 31 should be matched to the particular transistor used so that the voltage drop across the motor when the contacts are open is always greater than the voltage drop across the resistor 31 due to the collector-base leakage current. By matching the transistor characteristics to the value of the resistance 31, I mean that the collector-base current should have a relatively low value at normal temperatures so that, as the ambient temperature of the transistor increases, the collector-to-base current does not increase so much that it tends to override the reverse bias potential due to the voltage drop across the motor.

Having described my invention in terms of one illustrative embodiment, I claim:

In a motor governor circuit, a power circuit comprising a power source, a transistor, including emitter, collector and base electrodes, a motor connected in series with said power source and transistor and adapted to be energized at a high level when said transistor is conductive, a by-pass resistor in parallel with the emitter and collector electrodes of said transistor and providing a circuit for energizing said motor at a low level when said transistor is non-conductive, said motor being connected in series in said power circuit between said emitter electrode and a first terminal of said power source, a first bias circuit for rendering said transistor conductive comprising governor switch contacts and a non-resistive circuit for connecting the base electrode of said transistor directly to the second terminal of said power source whereby to apply control voltage of a first relative polarity between said emitter and base electrodes, and a second bias circuit for rendering said transistor non-conductive comprising a bias resistor connected to said base electrode and to a bias point in said power circuit between said motor and said first terminal, the relative impedances of said by-pass resistor and motor being such, in relation to the impedance of said bias resistor and the base electrode leakage current of said transistor, that the voltage drop across the motor and between said emitter electrode and said bias point is greater, under normal operating conditions when said governor switch contacts are open, than the voltage drop across said bias resistor due to leakage current, to apply a control voltage of a second relative polarity between said emitter and base electrodes to render said transistor non-conductive when said governor switch contacts are open.

No references cited.

JOHN F. COUCH, *Primary Examiner.*

MILTON O. HIRSHFIELD, ORIS L. RADER,
*Examiners.*